United States Patent [19]

Levin et al.

[11] Patent Number: 5,679,281

[45] Date of Patent: Oct. 21, 1997

[54] GELLED MATERIAL COMPOSITIONS WITH MODIFIED HALOPOLYMER

[75] Inventors: Gideon Levin, Rehovot, Israel; Lev Bromberg, Lynn, Mass.

[73] Assignees: Yeda Research and Development Co. Ltd.; The Weizmann Institute of Science, both of Rehovot, Israel

[21] Appl. No.: 211,206

[22] PCT Filed: Jul. 23, 1993

[86] PCT No.: PCT/US93/06924

§ 371 Date: Mar. 21, 1994

§ 102(e) Date: Mar. 21, 1994

[87] PCT Pub. No.: WO94/02240

PCT Pub. Date: Feb. 3, 1994

[30] Foreign Application Priority Data

Jul. 24, 1992 [IL] Israel .......................................... 102636

[51] Int. Cl.[6] .......................... B01J 20/26; B01J 37/30; C01B 31/16; C08F 14/06
[52] U.S. Cl. .............. 252/184; 252/315.1; 423/DIG. 14; 502/7; 502/402; 521/31; 521/32; 525/331.5; 530/417
[58] Field of Search .................... 252/315.1, 184; 502/402, 7; 521/31, 32; 524/390, 398; 530/417; 525/331.5; 423/DIG. 14

[56] References Cited

U.S. PATENT DOCUMENTS

| | | | |
|---|---|---|---|
| 3,247,133 | 4/1966 | Chen | 521/31 X |
| 3,502,545 | 3/1970 | Westman et al. | 435/180 |
| 3,884,846 | 5/1975 | Otsuki et al. | 521/32 |
| 3,991,018 | 11/1976 | Strop et al. | 521/32 |
| 4,220,726 | 9/1980 | Warshawsky | 521/55 |
| 4,806,393 | 2/1989 | Levin | 525/331.5 X |

FOREIGN PATENT DOCUMENTS

| | | |
|---|---|---|
| 0251852 | 1/1988 | European Pat. Off. . |
| 1051043 | 3/1986 | Japan . |
| 1033158 | 2/1989 | Japan . |
| 3264899 | 11/1991 | Japan . |

OTHER PUBLICATIONS

A. Warshawsky, "Extraction with Solvent–Impregnated Resins", vol. 8, Chapter 3 of Ion Exchange and Solvent Extraction, pp. 230–241. (1981).

H. Small, "Gel Liquid Extraction–The Extraction and Separation of Some Metal Salts Using Tri–n–Butyl Phosphate Gels", J. Inorg. Nucl. Chem., 1961, vol. 18, pp.232–244.

D. Oktavec et al., "Electronic Spectra of Salts of Dithiocarbamic Acids", Collection Czechoslov. Chem. Commun., vol. 44, 1979, pp. 2487–2493.

*Primary Examiner*—Richard D. Lovering
*Attorney, Agent, or Firm*—Steinberg, Raskin & Davidson, P.C.

[57] ABSTRACT

Gelled material compositions for use as adsorbents and ion exchangers. The composition including a specific extractant, an organic solvent and a halopolymer modified by substitution with a radical of a substance compatible with the specific extractant. Optionally the composition may be in form of beads.

22 Claims, 6 Drawing Sheets

GELLED MATERIAL COMPOSITIONS WITH MODIFIED HALOPOLYMER

This application is a 371 of PCT/US93/06924 filed Jul. 23, 1993.

FIELD OF INVENTION

The invention is in the field of organic synthetic polymers and relates specifically to gelled materials and beads prepared therefrom as well as to a method and a process for their preparation. These gelled materials and beads are characterized, inter alia, by high stability in contact with water solutions of inorganic salts, amino acids, peptides and proteins, and may be used in ion-exchange processes.

LIST OF REFERENCES

1. A. Warshawsky in "*Ion Exchange and Solvent Extraction*", Eds. A. Marinsky and Y. Marcus, Marcel Dekken, New York, Vol. 8, Chap. 3, p. 230.
2. H. Small, *J. Inorg. Nucl. Chem.* (1961), 18, 232.
3. D. Oktavec, J. Stefanec, B. Silec, V. Konecmy and J. Garaj, *Collection Czechoslov. Chem. Commun.*" (1977), 44, 2487.
4. I. S. Levin, V. V. Sergeeva, V. A. Tarasova et al., *Zh. Neorg. Khim.* (1973), 18, 1643.
5. M. C. Bitar, J. L. Sabot and P. Aviron-Viollet, E.P. 0,251,852.
6. H. Itoh, M. P. Thian, T. A. Hatton and D.I.C. Wang, *Biotechnol. Bioeng.*, 35, (1990) 853–860.

BACKGROUND AND PRIOR ART

Resins containing extractants have been used in analytical, hydrometallurgical and water processes. These impregnated resins have been prepared by two different general approaches (1):

i) Physical impregnation on a selected polymeric carrier, which yields a solvent-impregnated resin.
ii) Polymerization or copolymerization of two or more monomers containing a cross-linking agent in the presence of an extractant which yields a gel.

A variety of different types of gels that contain specific extractants are known and these can be classified as follows (1):

1. Gel-type resins from copolymerization of certain monomers.
2. Modified gel type resins, obtained by polymerization in an inert solvent. In cases where the solvent dissolves the monomer and solvates the polymer, telogenated polymers are produced, whereas when the polymer precipitates out, macroporous structures are obtained.
3. Swelled, cross-linked polymers or copolymers. Here the crosslinking agents are long-chain spacers instead of the conventional divinyl-benzene. These polymers have the ability to swell and Small (2) suggested that this property be utilized to incorporate extractant into the gel polymer.

Gelled materials are very attractive materials for use in exchange processes in general and ion-exchange processes in particular. The efficacy of such gels is due to the fact that with such materials the exchange process takes place nearly in the entire volume of the gel, while in conventional exchangers the exchange process takes place only on a surface of the polymeric support due to slow diffusion of ions through the bulk.

However, all the above known gel-type materials have a relatively low chemical and physical stability and thus suffer from high extractant losses. Also, the technologies for their preparation are complicated and expensive. In addition, preparation of stable and homogeneous beads from known gelled materials is difficult and relatively expensive.

There is thus a need for a new approach leading to cheap, improved gelled materials with high chemical and physical stability, high exchange capabilities and which are suitable for preparation of beads.

OBJECTS OF THE INVENTION

It is thus the object of the present invention to provide gelled materials comprising a chemically modified organic synthetic polymer and an extractant which overcome most of the above drawbacks of known gelled materials, and methods for their preparation.

It is a further object of the present invention to provide stable and homogeneous beads for use in ion-exchange operations comprising a chemically modified organic polymer and specific extractant, and a process for the preparation thereof.

It is yet a further object of the present invention to provide stable homogeneous beads for the adsorption and separation of biological compounds such as amino acids, peptides and proteins.

SUMMARY OF THE INVENTION

In the following specification and claims, polymers having a halogen atom in their backbone such as, for example, polyvinyl chloride (PVC), will be referred to as "halopolymers".

The invention is based on the finding that a simple specific chemical modification of halopolymers, increases the compatibility between the polymer and some specific extractant and is capable of forming together therewith stable gelled materials. It was found that only when the group used to modify the halopolymer is identical with or chemically closely related to the specific extractant, the halopolymer and the extractant become compatible and form a stable gelled material. The gelled materials so obtained were found useful for preparing beads for ion-exchange processes and adsorption and separation of amino acids, peptides and proteins.

The term "specific extractant" used herein denotes a substance having a selective affinity to a desired ion or molecule and is thereby capable of selectively extracting such ion or molecule from mixtures in which it is contained.

The invention thus provides a gelled material composition comprising a specific extractant, an organic solvent and a modified halopolymer substituted with a radical of a substance compatible with said specific extractant.

If desired, the composition may comprise also an amount of unmodified halopolymer.

The term "compatible" as used herein means that the substance from which there is derived the said radical used to modify said halopolymer, is identical with the specific extractant used, is a derivative or a salt thereof or is a compound which is physically compatible with said specific extractant in that the two have similar solubility properties. The stipulated compatibility is thus either chemical or physical and may also be a combination of both.

Examples of specific extractants are di(2-ethylhexyl) dithiophosphoric acid and di(2-ethylhexyl) phosphoric acid (DEHPA), and examples of modifying substances compatible therewith are the alkali salts of dialkyldithiocarbamate or of dialkyldithiophosphoric acid wherein the alkyl moiety has at least 5 carbon atoms, e.g. the alkali salts of dioctyldithio-carbamate and diisooctyldithiophosphoric acid.

The starting halopolymer used in accordance with the present invention for making said modified halopolymer, may, for example, be a halogenated polyvinyl such as polyvinyl chloride; halogenated derivatives of any of polyolefin, polyvinylacetate, polystyrene, polyacrylate and polyacrylamide; a copolymer of vinylchloride with any of vinylacetate, acrylonitrile, vinyl alcohol, an acrylate, acrylamide and others; and the like. A preferred starting material is PVC.

The invention also provides a method for preparing a gelled material composition of the kind specified, characterized in that a halopolymer is modified by reaction with a substance compatible with said specific extractant, the modified halopolymer so obtained is admixed with said specific extractant and the resulting mixture is dissolved in an organic solvent.

If desired, the organic solvent may be heated in order to obtain an homogeneous solution.

Examples of organic solvents which may be used in accordance with the invention are dioxane, tetrahydrofuran (THF), dimethylsulfoxide (DMSO) and dimethylformamide (DMF).

By another aspect the invention provides beads for use in ion-exchange processes, comprising at least one gelled material composition of the kind specified above.

By a further aspect of the invention, there is provided a process for the preparation of such beads, comprising dripping a gelled material composition of the kind specified into an aqueous surfactant solution, filtering off the solution and drying the beads so obtained, if desired under vacuum.

Particularly good results are obtained when the organic solvent in the gelled material composition from which the beads are prepared, is dioxane.

Suitable surfactants for use in the above process are those selected from the group consisting of polyethyleneglycol, polyvinylacetate, or a copolymer of polyethylene glycol terminated by substituted phenols, a preferred surfactant being an aqueous solution of 4% (v/v %) of polyethyleneglycol having a molecular weight of about 4,000.

By yet another aspect the invention provides as novel products a PVC based polymer selected from the group consisting of dioctyldithio-carbamate-substituted PVC; diisooctyldithiophosphate-substituted PVC and dithiophosphate-substituted PVC.

The gelled materials and beads prepared according to the present invention have the advantage of being chemically and physically stable and they profess only relatively low losses of extractant even when in the course of an ion-exchange operation a very aggressive eluent of extremely low pH is used. The beads proved to be stable also during the adsorption and release of amino acids, peptides and proteins at pH=2.5 or pH=7.4 under pharmacologically important temperatures such as 20°, 37° and 45° C. The beads prepared in accordance with the invention have good ion-exchange capabilities and are, in addition, round and homogeneous, a characteristic which hitherto was difficult to achieve.

The method of preparing a gelled material and the process of making beads therefrom, both as taught by the present invention, are simple and inexpensive. The starting halopolymer may, for example, be polyvinyl chloride, a cheap and well known polymer, which may be modified by a simple, one step nucleophilic reaction.

BRIEF DESCRIPTION OF THE DRAWINGS

In the following Examples, the preparation of gelled materials and making beads therefrom, as well as results achieved with beads prepared in accordance with the present invention, will be described with reference to the annexed drawings in which.

DESCRIPTION OF SPECIFIC EMBODIMENTS

EXAMPLE 1

Preparation of a chemically modified polymer: A dioctyldithiocarbamate-substituted polymer Dioctyldithiocarbamate (DODTC) which is used as a nucleophilic agent in the reaction with polyvinyl chloride (PVC) to produce the modified polymer containing the DODTC group, was first prepared by reacting the sodium salt of dioctylamine with carbon disulfide according to the general procedure given in ref. 3. Then one mol of PVC (43 grade, Frutarom, Israel) was dissolved in 750 cm$^3$ of dried dimethylformamide (DMF) until a transparent solution was obtained. Then a solution of 0.4 mol of DODTC sodium salt in 200 cm$^3$ of DMF was added to the above solution. The obtained solution was heated to 45° C. under stream of nitrogen for several hours. Samples were withdrawn from the reaction mixture at various intervals and dissolved in methanol and precipitated therefrom. The polymer was washed with water and methanol to remove the unreacted DODTC and the remaining sodium salt, and dried under vacuum at room temperature. Sulfur (S, w/w %) and chlorine (Cl,w/w %) elemental analysis as a function of the reaction time are given in Table 1:

TABLE 1

The relation between the reaction time and the sulfur w/w content (% S), and chlorine w/w content (% Cl) of dioctyldithiocarbamate-substituted PVC.

| Sample | Time, min | % S | % Cl |
| --- | --- | --- | --- |
| 0 | 0 | 0.00 | 56.80 |
| 1 | 90 | 4.85 | 42.45 |
| 2 | 180 | 5.52 | 38.75 |
| 3 | 270 | 6.12 | 36.64 |
| 4 | 345 | 7.06 | 34.72 |
| 5 | 2 days | 8.59 | 28.18 |
| Complete substitution | (calculated) | 18.65 | 6.00 |

EXAMPLE 2

Preparation of a chemically modified polymer: A di(2-ethylhexyl)dithiophosphate-substituted PVC Di(2-ethylhexyl)dithiophosphoric acid was synthesized and purified according to ref. 4. The sodium salt of di(2-ethylhexyl)dithiophosphoric acid was prepared by the reaction of 0.019 mol of NaH with 0.02 mol of di(2-ethylhexyl) dithiophosphoric acid.

The modification of the polymer was carried out in the following way: 0.06 mol of PVC (43 grade, Frutarom, Israel), was mixed with 25 cm$^3$ of dried DMF until a transparent solution was obtained. To this solution there was added 0.02 mol of the sodium salt of di(2-ethylhexyl) dithiophosphoric acid dissolved in 35 cm$^3$ of DMF. The mixture was heated to 45° C. under nitrogen. The polymer was washed with water and methanol to remove the unreacted di(2-ethylhexyl)dithiophosphoric acid and the remaining sodium salt, and dried under vacuum at room temperature. Samples were withdrawn from the reaction mixture, at various intervals, dissolved and precipitated therein in methanol. Elemental analysis of one of the polymer fractions showed: S=4.1%, Cl=42.1%.

EXAMPLE 3

The effect of the nature of the substituting group in the polymer on the formation of gelled material with di(2-ethylhexyl) dithiophosphoric acid To verify the effect of the relationship between the nature of the substituting group on the polymer backbone and the specific extractant on stability of the gels obtained, a series of clear solutions of THF containing the investigated polymers and di(2-ethylhexyl)dithiophosphoric acid were prepared. It was found that PVC, polyvinyl acetate, diethyldithiocarbamate-substituted PVC and dibenzyldithiocarbamate-substituted PVC do not form a gel with di(2-ethylhexyl) dithiophosphoric acid. Only the modified polymers of Examples 1 and 2 were found to form stable gel material with di(2-ethylhexyl) dithiophosphoric acid. These results demonstrate that the substituents on the polymer backbone should be compatible with the specific extractant used in the preparation of the gel.

EXAMPLE 4

Preparation of beads comprising dioctyldithiocarbamate-substituted PVC and di(2-ethylhexyl) dithiophosphoric acid.

A mixture of dioctyldithiocarbamate-substituted PVC (S=4.9%, Cl=42.5%), PVC and di(2-ethylhexyl) dithiophosphoric acid in a weight ratio of 1.0: 2.3: 3.4, was stirred in 10 g of dioxane at 40° C. until a transparent viscous polymeric solution was obtained. The solution was dripped by means of a syringe and a needle into a 4% v/v solution of the surfactant polyethyleneglycol ($M_w \approx 4,000$) in deionized water under stirring in a coagulation bath whereupon coagulation took place. The resulting beads were filtered and dried under vacuum. Sulfur and Chlorine elemental analysis of the dried beads showed: S=7.7% and Cl=29.5%.

EXAMPLE 5

Preparation of beads comprising diotyldithiocarbamate substituted PVC and di(2-ethylhexyl)—phosphoric acid (DEHPA).

PVC modified by dioctyldithiocarbamate (S=5.52%, Cl=38.75%, glass transition at 51° C.) was synthesized as described in Example 1 above.

Figure 7:
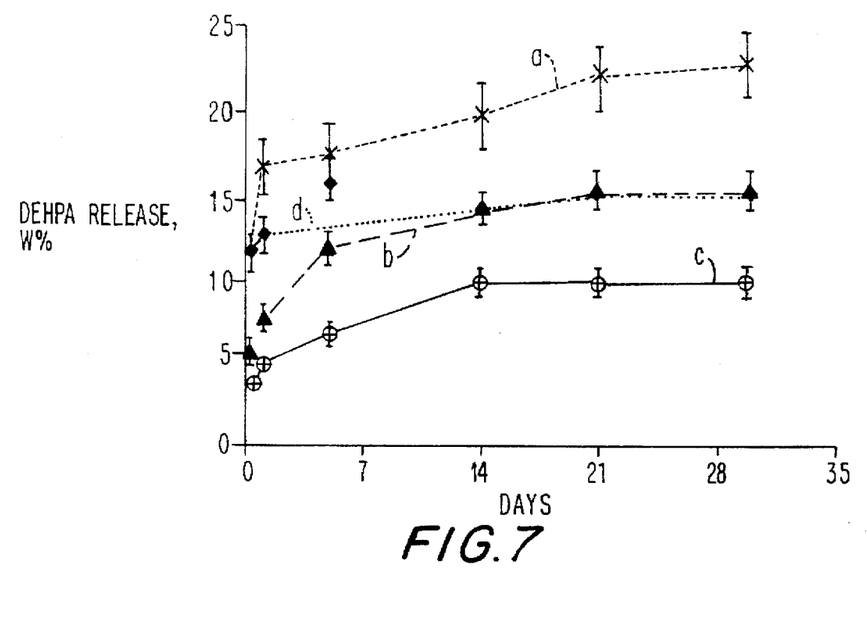
FIG. 7 is a graphical representation showing kinetics of DEHPA release from Series 1 gels made in accordance with Example 5 herein at various temperatures. The release data are related to the initial amount of DEHPA in the gel. Curves a–c represent data obtained with citrate buffer (pH 2.5) and data shown on curve d were obtained with phosphate buffer (pH 7.4). Temperatures are as follows: 20° (c,d), 37° (b) and 45° C. (a)

An amount of 0.5 g of the above modified polymer (MP) was stirred with 1.7 g DEHPA (Fluka Chemical Co.) in tetrahydrofuran ((THF) until a clear solution was obtained. Then the viscous solution was cast on a glass slide and THF was evaporated. The formed gel was allowed to stay on the glass for a week, and an excess DEHPA releasing from the gel was gently wiped up by the filter paper. The resulting Series 1 gel contained 91 w % DEHPA and 9 w% MP. In Series 2, the gel containing 75 w % DEHPA and 25 w % MP was prepared as described above by varying the initial ratio of the components. The resulting gels were cut to the cubic shaped beads of approx. 1.5×1.5×1.5 mm each and were stored at room temperature under dry conditions. Stability tests were conducted to establish the DEHPA rentention capacity of the gel, and the results are shown FIG. 7.

EXAMPLE 6

The performance of beads prepared according to Example 4.

To evaluate the performance of beads prepared according to the present invention a series of ion-exchanges column were prepared using the beads prepared according to Example 4.

Each column consisted of a polyethylene tube having an internal diameter 4.5 mm and closed at the end by the three-way stopcock connected to the syringe. Weighted amounts of beads (0.2–0.3 g) were transferred in small increments to the columns and pressed gently with a flat-ended rod in order to obtain a uniform packing of the beads in the column. The resin bed height in the packed columns was set to about 33-35 mm. Beads were then pretreated with 1M $H_2SO_4$ and rinsed with distilled water. Metal ion concentrations in the eluents were monitored with a Perkin Elmer Model 5100 PC atomic absorption spectrophotometer and pH values were measured with the aid of a Cornin Model 240 pH-meter.

First, aqueous solutions of silver nitrate, lead acetate and cadmium acetate having concentrations of about 100 ppm each were passed through one of the packed columns. Then the column was rinsed with 3 bed volumes of distilled water. All three cartons, which form strong neutral or anionic complexes with the gelled material of the beads, were stripped off selectively from the column by changing the constituents of the eluent solutions.

Figure 1:
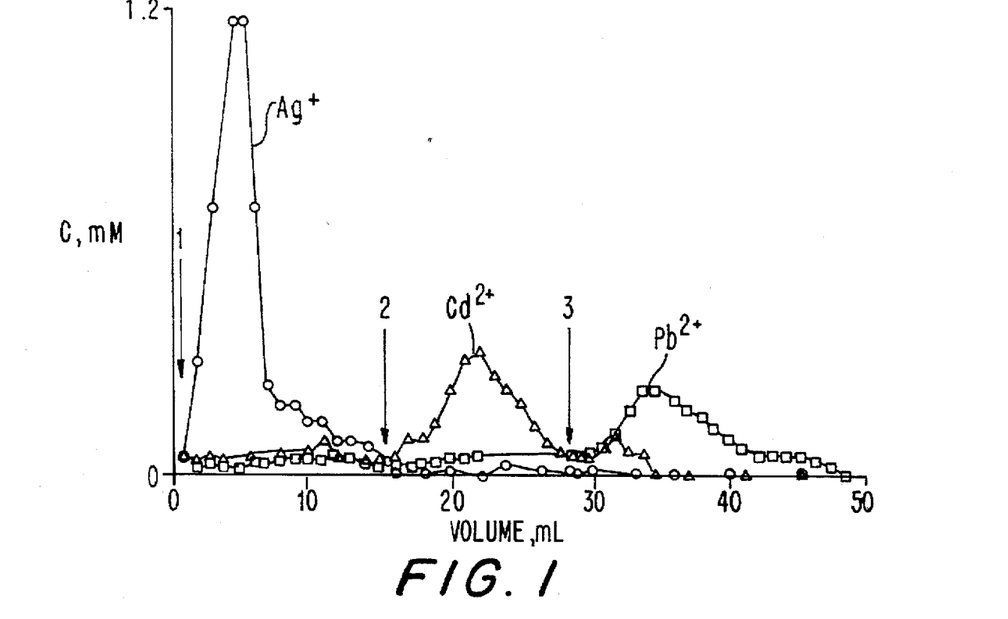
FIG. 1 is a graphical representation showing the elution of $Ag^+$, $Cd^{2+}$ and $Pb^{2+}$ by different eluents from a column packed with beads prepared according to Example 4 herein and loaded with these cations.

FIG. 1 shows the selective elution of these metal ions by eluents containing proper complexing anions. Using 1M $H_2SO_4$ saturated with thiourea only $Ag^+$ was stripped off the column (see peak following arrow in FIG. 1) while 9M HCl was used to strip off the column the $Cd^{2+}$ cation (see peak following arrow 2). $Pb^{2+}$ was selectively stripped off the column by 0.13M sodium salt of ethylenediaminetetracetic acid (see peak following arrow 3). Each time before the eluent was changed each column was rinsed with 5-10 ml of distilled water.

This experiment clearly demonstrates the selectivity of the separation of microamounts of these metal ions and demonstrates the potential application of beads according to the invention in extraction chromatography for analytical purposes.

The effect of the weight ratio of the constituents of the beads on the performance of the beads in ion extraction chromatography was verified by repeating the above experiment with beads prepared similarly as in Example 4 with, however, a different weight ratio of the modified polymer, PVC and di(2-ethylhexyl) dithiophosphoric acid, which in this case was 1.0: 10.2: 9.0.

Figure 2:
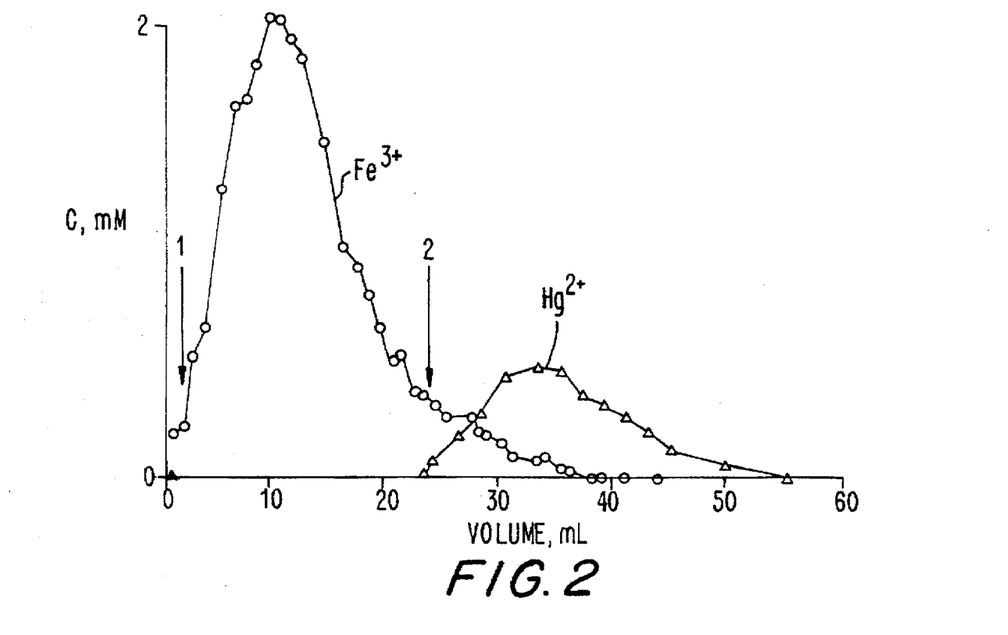
FIG. 2 is a graphical representation showing the elution of $Fe^{3+}$ and $Hg^{2+}$ by different eluents from a column of beads prepared according to Example 4 herein, and loaded with these cations.

Using another packed column, the beads were loaded with $Fe^{+3}$ and $Hg^{+2}$ ion by passing through the column water solutions containing $Fe(NO_3)_3$ and $Hg(NO_3)_2$ of 100 ppm each and the results are shown in FIG. 2. $Fe^{+3}$ ion was stripped off the column by using 1M oxalate (the peak following arrow 11). At this stage no $Hg^{2+}$ was stripped off the column and only after the addition of 1M $H_2SO_4$, saturated with thiourea the $Hg^{2+}$ was strip off the column (peak following arrow 2).

This experiment demonstrates that good elution selectivity is retained even when the weight ratio between the three major constituents of gelled material in the beads is very different.

EXAMPLE 7

Figure 3:
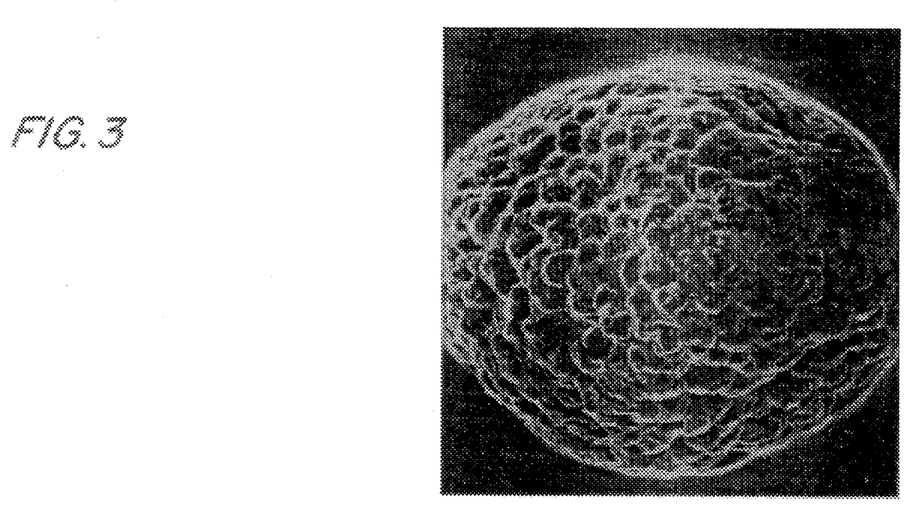
FIG. 3 is a scanning electron microscopy (SEM) picture of a bead prepared according to Example 7.

Preparation of beads comprising di(2-ethylhexyl) dithiophosphate-substituted PVC and di (2-ethylhexyl)dithiophosphoric acid;

A mixture of di(2-ethylhexyl)dithiophosphate-substituted PVC, PVC and di(2-ethylhexyl)dithiophosphoric acid in a weight ratio of 1.0: 0.9: 1.1 was stirred in dioxane at 400° C. until a transparent solution was obtained. The weight percent of dioxane in the solution was about 83%. Then the viscous polymeric solution was dripped by means of a syringe and a needle into a 4% v/v surfactant (polyethyleneglycol, $M_w \approx 4,000$) solution in deionized water under stirring in a coagulation bath whereupon coagulation occurred. Then the coagulation solution was filtered off and the beads so obtained were dried under vacuum. Sulfur and chlorine elemental analysis of the content of the dried beads showed: S=7.0% and Cl=32.9%. A scanning electron microscopy picture of a bead prepared according to the above procedure is shown in FIG. 3. This cross-cut picture of the bead taken on a SEM Philips Model 505 microscope having a MicroScan Tracor energy dispersive spectroscopy attachment shows the essentially round shape of the bead which has a diameter of about 1 mm.

Blank material without any polymer modification was prepared by mixing 0.22 g PVC and 0.22 g of di(2-ethylhexyl) dithiophosphoric acid in 5 g dioxane at 40° C. making beads from this material in the manner described above. The elemental analysis of these beads showed: S=8.6% and Cl=33.65%.

EXAMPLE 8

Performance of beads prepared according to Example 7.

To evaluate the performance, beads prepared according to Example 7 were packed into columns by the procedure described in Example 6.

Figure 4:
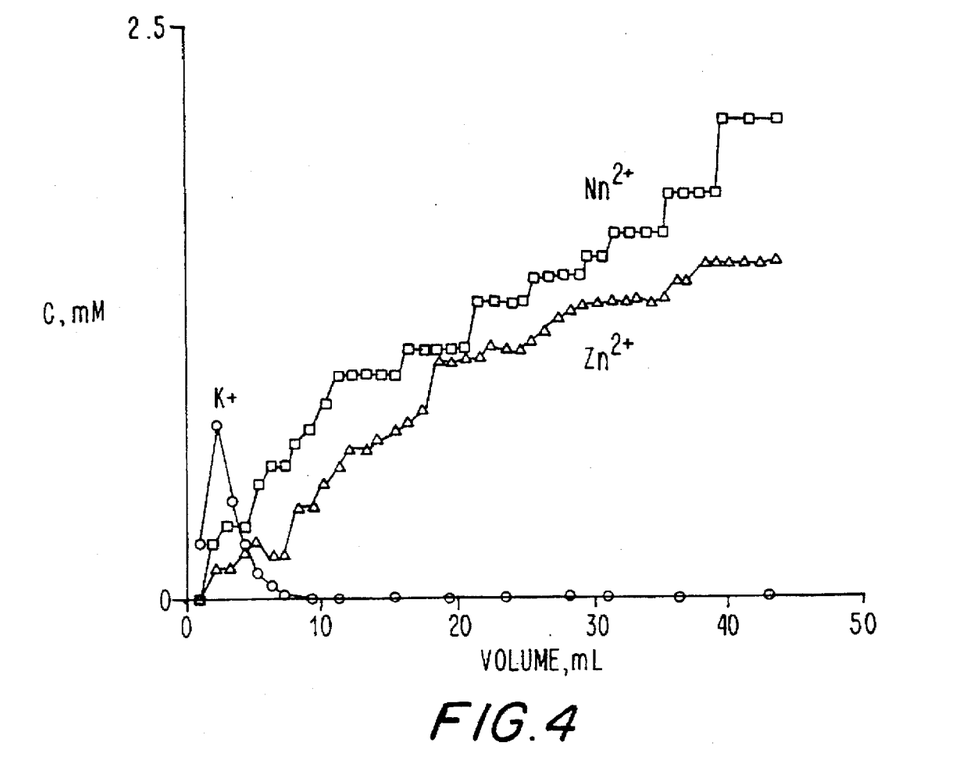
FIG. 4 is an output curve obtained by the displacement of $K^+$ by $Ni^{2+}$ and $Zn^{2+}$ in aqueous solution from a column packed with beads prepared according to Example 7 and which was first treated with a saturated aqueous solution of $KNO_3$.

In a series of experiments by which water solutions of different metal ions were eluted from the columns sequentially, the displacement of metal cations by each other were found to be in excellent agreement with their respective adsorption affinities. For example, $Ag^+$ which forms very stable complexes with the beads containing di(2-ethylhexyl) dithiophosphoric acid did replace all other metal ions investigated. $Ni^{2+}$ and $Zn^{2+}$ were able to displace $K^+$ from a column that was loaded on by passing through the column a saturated solution of $KNO_3$. A solution of $Ni(CH_3COO)$ and $Zn(CH_3COO)_2$ was run following the $KNO_3$ solution and the results of this experiment are shown in FIG. 4.

Similar experiments were conducted with other cations and the sequence of displacement of the various metal cations investigated was found to be in the following order:

$$Ag^1Hg^{2+}>Pb^{2+}>Fe^{3+}>Cd^{3+}>Ni^{2+}>Zn^{2+}>>K^+$$

These metal ion exchange experiments were also performed using beads prepared from the blank materials which contained only unmodified PVC and di(2-ethylhexyl) dithiophosphoric acid. In the course of the experiment these beads soon lost the described shape forming fibrilles, and almost entirely lost their ion exchange capacity after the first extraction-stripping cycle. In contrast, the cation exchange columns packed with beads prepared according to Example 6 retained their selective ion-exchange capacity during 20 and more extraction-stripping cycles. After an initial decrease of ion-exchange capacity of about 20-30% during the first 5-10 cycles their ion-exchange capacity reached an equilibrium. The Cl and S content of the beads after 25 cycles was found to be S=3-5% and Cl=42.3-47.5%.

Figure 5:
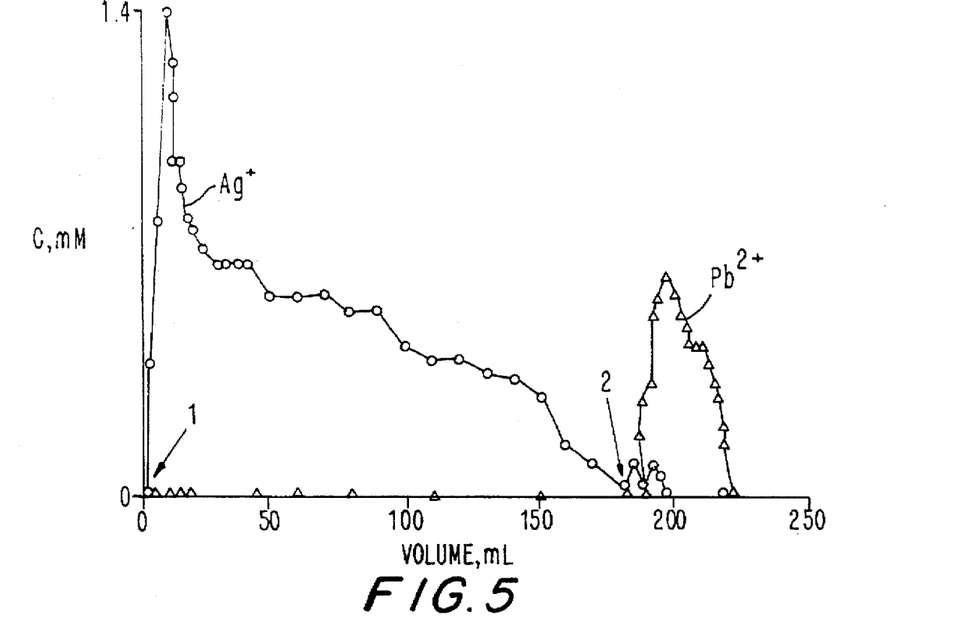
FIG. 5 is a graphical representation showing the elution of $Ag^+$ and $Pb^{2+}$ by different eluents from a column packed with beads prepared according to Example 7 and loaded with these cations.

In a separate experiment a column was loaded with $Ag^+$ and $Pb^{2+}$ by passing through the column solutions of $AgNO_3$ and $Pb(CH_3COO)_2$ having concentrations of about 100 ppm each. Then two eluent solutions one of 1M $H_2SO_4$ saturated with thiourea and the other of 0.13M sodium ethylenediaminetetracetic acid were passed through the column sequentially. The results are shown in FIG. 5. As can be seen, $Ag^+$ was stripped off from the column by eluting with 1M $H_2SO_4$ saturated with thiourea (peak following arrow 1) and the $Pb^{2+}$ cation was stripped off by elution with 0.13M EDTA solution. These results show that also these beads have high metal ions selectivity and may thus also be used for analytical purposes.

Figure 6:
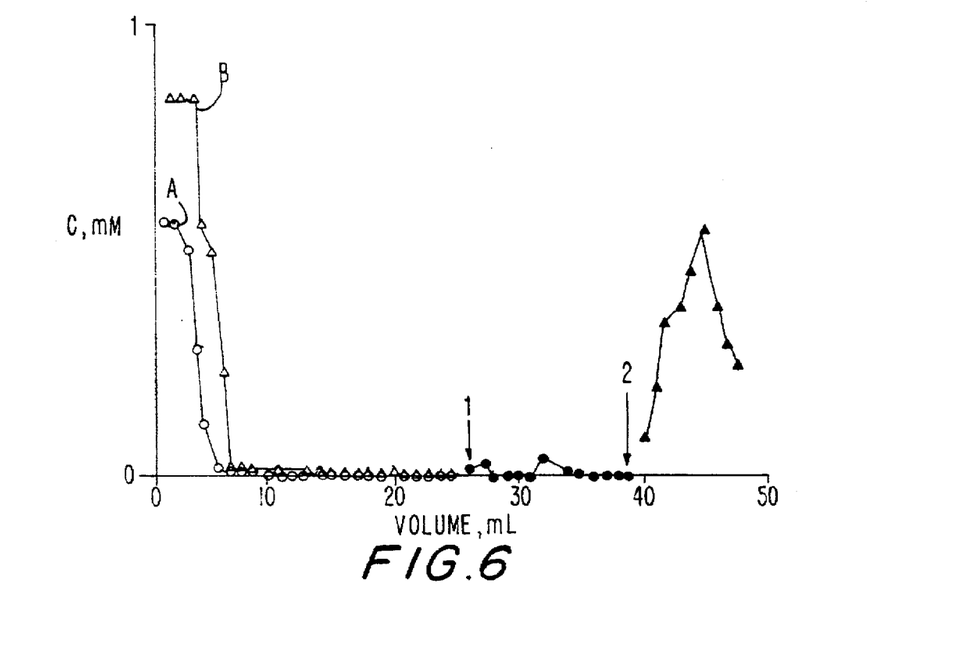
FIG. 6 is a graphical representation showing the recovery of $Ag^+$ cations from an $AgNO_3$ solution in deionized water (curve A) and from Kodak Co. developer waste solution (curve B) using beads prepared according to Example 7, with the use of different eluents.

In further experiments the recovery of silver cations from aqueous solutions by means of columns packed with beads prepared according to Example 7 was monitored. FIG. 6 demonstrates the performance of the column in the extraction of silver cations from a solution of AgNO$_3$ in deionized water (curve A) and from a filtered waste solution containing AgNO$_3$ (curve B). The waste solution was obtained from the photographic process using a photofinisher of Kodak Co. (curve 2) and contained 1.4 mM AgNO$_3$, 1.3M Na$_2$S$_2$O$_3$ and 10 mM NaBr.

FIG. 6 also demonstrates the selectivity of the stripping off of the Ag$^+$ cations from these beads. No elution of Ag$^+$ occurred with 1.3M Na$_2$S$_2$O$_3$ solution (flat part following arrow 1). By contrast, fast elution took place with a 1M H$_2$SO$_4$ and 9M HCl (peak following arrow 2).

These experiments demonstrate that the beads prepared according to the present invention are very stable and have a very high cation selectivity. Very aggressive eluents such as 1M H$_2$SO$_4$ and 9M HCl may be used anti the beads may be used repeatedly without a significant reduction in their ion-exchange capability. The blank experiments do prove unequivocally that the nature of the gels and beads according to the present invention is responsible for the superior ion-exchange performance.

These above experiments also show that ion-exchange capacity and selectivity of the gels and beads according to the invention is manifested within a wide range of weight ratio between the three major components thereof.

EXAMPLE 9

The performance of beads prepared according to Example 5

Adsorption of Amino Acids and Peptides

In adsorption experiments, certain amino acid or peptide was dissolved in citrate buffer (pH 2.0) or phosphate buffer (pH 7.4) resulting in 10 mM stock solution. The pH of the stock solution was adjusted to pH 2.0 or 7.4 by HCl or NaOH. The beads (0.2 g) and the stock solution were placed into a vial and shaken at 30° C. Sampling was done after 48 hours. In the control experiments beads made of non-modified PVC (Aldrich Chemical Co., medium molecular weight) or polystyrene (Polysciences, Inc., molecular weight 110,000) were placed in the stock solution and shaked. Adsorption of all amino acids and peptides studied was below 3 mg per 1 g of the air-dry sample of PVC or polystyrene.

Data on effective loading of the gelled materials as well as molecular weights and pK of carboxyl groups of amino acids and peptides are collected in the following Table 2.

It can be seen from Table 2 that at pH 2.0 below isoelectric point when the COOH groups are substantially uncharged and amino groups are protonated and thus amino acids are charged positively the loading of the gels exceeded the one at pH 7.4 when amino acids and peptides beared both positive and negative charges. Adsorption of amino acids increased with the rise of their pI values. These data suggest substantially ion-exchange mechanism of adsorption of amino acids on the gels. The latter can be regarded as cation exchange material due to DEHPA component. Adsorption of lysine, Lys-Lys and chain B of insulin exceeded the adsorption of all the other amino acids and peptides studied. This fact can be explained, first, by the presence of the side amino groups on Lys and Arg, and second, by the presence of the aliphatic chains which could enhance the adsorption due to additional hydrophobic interactions with the hydrocarbon tails of DEHPA. From the data shown in Table 2, we conclude that the adsorption mode can be regulated by varying pH and the amino-acid and peptide adsorption on the gelled material is selective.

TABLE 2

Molecular weights, apparent dissociation constants of carboxylic groups, isoelectric points and adsorption of amino acids and peptides on gelled materials

| | | | | Effective loading, mg/g air-dry resin | | | |
|---|---|---|---|---|---|---|---|
| | | | | Series 1 | | Series 2 | |
| Amino acid or peptide | M.W. | pKCOOH | pI | pH 2.0 | pH 7.4 | pH 2.0 | pH 7.4 |
| Aspartic acid | 133.1 | 1.88 | 2.77 | 5 | <3 | 5 | <3 |
| Phenylalanine | 165.2 | 1.83 | 5.48 | 11 | <3 | 5 | <3 |
| Tyrosine | 181.2 | 2.20 | 5.66 | 16 | <3 | 15 | <3 |
| Histidine | 155.2 | 1.82 | 7.59 | 18 | <3 | 15 | <3 |
| Lysine | 146.2 | 2.18 | 9.74 | 41 | 5 | 30 | 5 |
| Arginine | 174.2 | 2.17 | 10.76 | 46 | 8 | 40 | 6 |
| Glutathione | 307.3 | 2.12 | 2.83 | 10 | 5 | 10 | <3 |
| Glycyl-glycine | 132.1 | 3.06 | 5.60 | 16 | 6 | 10 | <3 |
| Lysyl-lysine | 347.3 | 1.95 | 10.04 | 58 | 12 | 45 | 7 |
| Insulin chain B, oxidized | 3495.9 | | 5.5 | 35 | 15 | 30 | 8 |

Adsorption of Proteins

Figure 8:
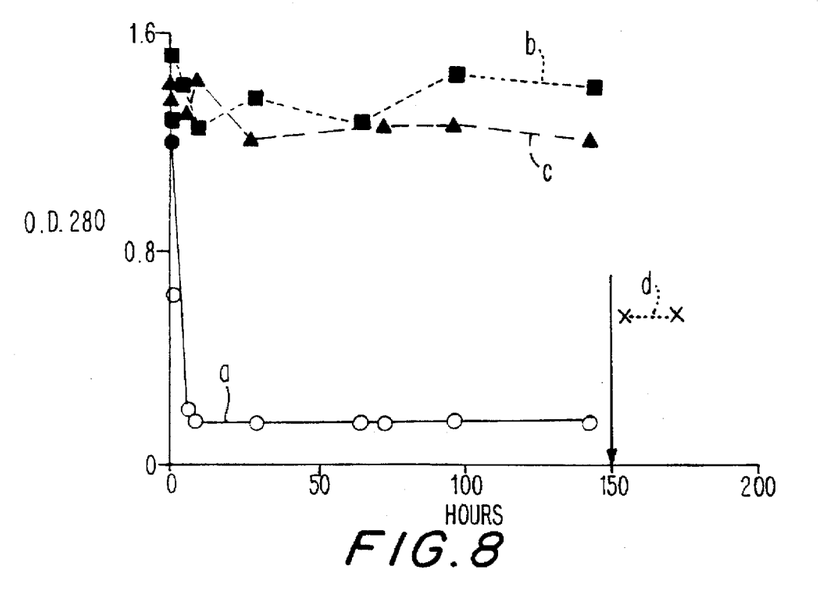
FIG. 8 is a graphical representation showing kinetics of insulin aggregation and adsorption on the gels of Series 1 (a,d) of Example 5 herein as compared to the ones on PVC (b) and polystyrene (c). Filled points represent turbid solution and open points show clear solution. Arrow indicates the moment of sodium dodecylsulfate (SDS) addition. Crosses show optical density of the SDS (20 mM) and insulin solution at 280 nm.

Interaction of proteins with the gelled material developed was observed to have dualistic character: adsorption being mostly dependent on hydrophobic interactions, was also affected by pH of the aqueous solutions. Adsorption mechanism was as follows: protein agglomerated upon contacting hydrophobic surface of the gel and then the precipitated particles were absorbed. FIG. 8 (curve a) shows concentration profiles (expressed in optical density units at 280 nm) of insulin agglomeration and adsorption on the gel (Series 1, 0.5 g of air-dry heads). Initial aqueous solution (5 ml) contained 0.1 mM of insulin and 0.05M HCl. Open points correspond to the transparent clear solution, filled points represent turbid solution and crosses show optical density upon addition of sodium dodecylsulfate (SDS). Curves b and c show the control experiments with PVC and polystyrene, respectively. It can be seen that insulin solution turned cloudy upon contacting hydrophobic particles. In the case of PVC and polystyrene the solution remained turbid all the experiment long, whereas in the case of the gelled material (curve a) after about 0.5 hours the solution became clear and the insulin concentration drastically decreased. No protein particles was observed in the solution or on the walls of the vial. Loading of gelled material exceeded 45 mg of insulin per 1 g of air-dry resin. In other words, all insulin initially present in the aqueous solution was adsorbed. Insulin could be recovered back into aqueous solution by adding of sodium dodecylsulfate (after arrow) resulting in SDS concentration equal to 20 mM.

Figure 9:
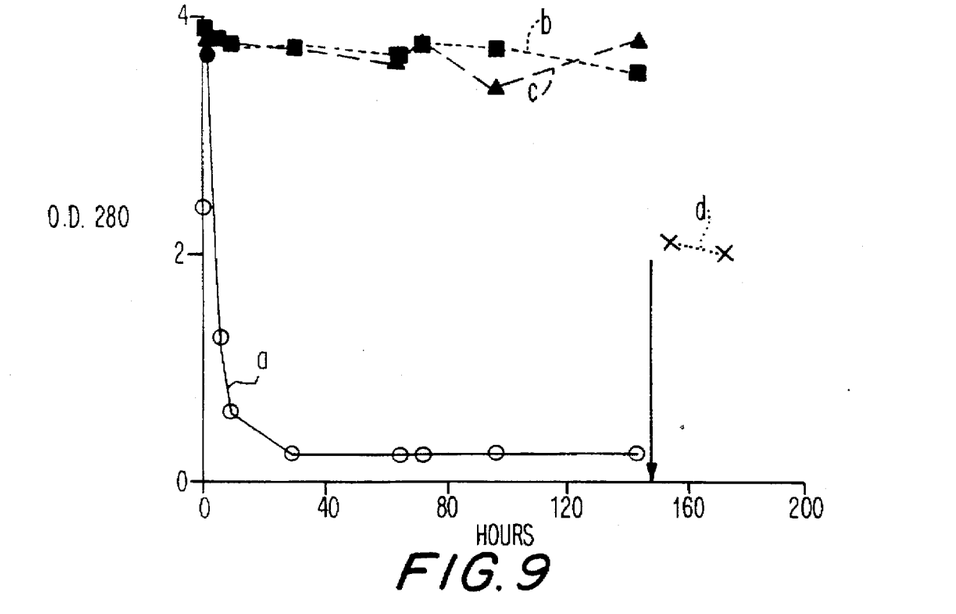
FIG. 9 is a graphical representation showing kinetics of chymotrypsinogen A aggregation and adsorption on the gels of Series 2 of Example 5 herein (a,d) as compared to the ones on PVC (b) and polystyrene (c). Filled points represent turbid solution and open points show clear solution. Arrow indicates the moment of SDS addition. Crosses show optical density of the SDS (20 mM) and chymotrypsinogen solution at 280 nm.
Figure 10:
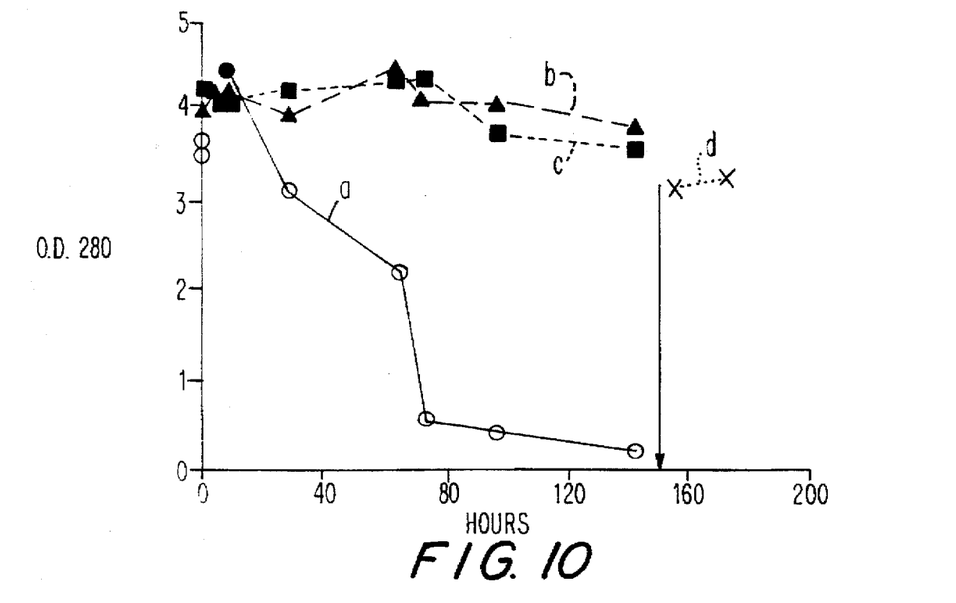
FIG. 10 is a graphical representation showing kinetics of bovine serum albumin aggregation and adsorption on the gels of Series 2 of Example 5 herein (a,d) as compared to the ones on PVC (b) and polystyrene (c). Filled points represent turbid solution and open points show clear solution. Arrow indicates the moment of SDS addition. Crosses show optical density of the SDS (20 mM) and protein solution at 280 nm.

Similar results were obtained with chymotrypsinogen A (FIG. 9) and bovine serum albumin (BSA) (FIG. 10) dissolved in citrate buffer (pH 2.5, of protein). Effective loading of proteins on gels (Series 2, 0.5 in each experiment) at this pH which is lower than their pI (equal to 9.1 for chymotrypsinogen and 4.9 for BSA) approached 200 mg per 1 g of air-dry resin in the case of chymotrypsinogen and 500 mg/g resin in the case of BSA after 7 days of shaking at 30° C. Proteins were completely recovered from the resin by 20 mM SDS. In the phosphate buffer (pH 7.4), BSA adsorption did not exceed 20-30 mg/g resin after 7 days of experiment. Large protein agglomerates were observed flotating in the solution.

We claim:

1. A gelled material composition prepared by a process comprising the steps of:
   (a) modifying a starting halopolymer by reacting said halopolymer with a hydrophobic radical of a substance able to form a gel with a specific extractant, said hydrophobic radical being selected from the group consisting of alkali salts of dialkyldithiocarbamates and dialkyldithiophosphoric acid, in which the alkyl moiety has at least five carbon atoms.
   (b) mixing said modified halopolymer and said specific extractant to produce a mixture thereof,
   (c) dissolving the mixture provided by step (b) in an organic solvent in a proportion selected to produce a gelled material composition suitable for the performance of exchange processes,
wherein said specific extractant has a selective affinity to an ion or molecule to be complexed to the gelled material composition, and said specific extractant is selected from the group consisting of di(2-ethylhexyl)dithiophosphoric acid and di(2-ethylhexyl)phosphoric acid and a modified halopolymer selected from the group consisting of a dialkyldithiocarbamate-substituted halopolymer and a dialkyldithiophosphate-substituted halopolymer, in which the alkyl moiety has at least five carbon atoms.

2. The gelled material composition of claim 1 wherein an amount of said unmodified halopolymer is incorporated into the mixture of step (b).

3. The gelled material composition of claim 1 wherein the staring halopolymer is a halogenated derivative of a polymer selected from the group consisting of a polyolefin, a polyvinyl, a polyvinyl acetate, polystyrene, polyacrylate and polyacrylamide.

4. The gelled material composition of claim 1 wherein said halopolymer is selected from the group consisting of polyvinyl chloride and a vinylchloride copolymer.

5. The gelled material composition of claim 1 wherein the organic solvent is heated before the mixture of step (b) is dissolved.

6. The gelled material composition of claim 1 wherein the organic solvent is selected from the group consisting of dioxane, tetrahydrofuran, dimethylsulfoxide and dimethylformamide.

7. The gelled material composition prepared by the process of claim 1 from which said organic solvent is removed after the gelled material composition is formed.

8. A product selected from the group consisting of dioctyldithiocarbamate-substituted polyvinyl chloride; diisooctyldithiophosphate-substituted polyvinyl chloride and di(2-ethyl-hexyl) dithiophosphate-substituted polyvinyl chloride.

9. The product of claim 8 that is selected from the group consisting of diisooctyldithiophosphate-substituted polyvinyl chloride and di(2-ethylhexyl)-dithio- phosphate-substituted polyvinyl chloride.

10. The product of claim 8 that is formed into beads suitable for use in ion-exchange processes.

11. The product of claim 8 that is formed into beads suitable for use in mixed mode chromatography.

12. A gelled material composition suitable for the performance of exchange processes comprising a specific extractant selected from the group consisting of di(2-ethylhexyl) dithiophosphoric acid and di(2-ethylhexyl)phosphoric acid and a modified halopolymer selected from the group consisting of a dialkyldithiocarbamate-substituted halopolymer and a dialkyldithiophosphate-substituted halopolymer, in which the alkyl moiety has at least five carbon atoms.

13. The gelled material composition of claim 12, wherein said modified halopolymer is a member of the group consisting of dialkyldithiocarbamate-substituted and dialkyldithiophosphate-substituted polyvinyl chlorides and vinyl chloride copolymers.

14. The gelled material composition of claim 13, wherein said modified halopolymer is a member of the group consisting of dioctyldithiocarbamate-substituted polyvinyl chloride, diisooctyldithiophosphate-substituted polyvinyl chloride and di(2-ethylhexyl)dithiophosphate polyvinyl chloride.

15. The gelled material composition of claim 14 that is formed into beads suitable for use in ion-exchange processes.

16. The gelled material composition of claim 14 that is formed into beads suitable for use in mixed mode chromatography for extracting substances selected from the group consisting of amino acids, peptides and proteins.

17. The gelled material composition of claim 12 that is formed into beads suitable foe use in ion-exchange processes.

18. The gelled material composition of claim 12 that is formed into beads suitable for use in mixed mode chromatography for extracting substances selected from the group consisting of amino acids, peptides and proteins.

19. A gelled material composition suitable for the performance of exchange processes comprising a specific extractant that is selected from the group consisting of di(2-ethylhexyl)dithiophosphoric acid and di(2-ethylhexyl) phosphoric acid, an organic solvent and a modified halopolymer substituted with a hydrophobic radical of a substance able to form a stable gel with said specific extractant, that together form said gelled material composition suitable for the performance of exchange processes,
   wherein said substance able to form a stable gel with said specific extractant is selected from the group consisting of alkali salts of dialkyldithiocarbamates and dialkyldithiophosphoric acid, in which the alkyl moiety has at least five carbon atoms.

20. A gelled material composition according to claim 19, wherein said substance able to form a stable gel with said specific extractant is an alkali salt selected from the group consisting of dioctyldithiocarbamate, diisooctyldithiophosphoric acid, and di(2-ethylhexyl)dithiophosphoric acid.

21. The gelled material composition of claim 19 that is formed into beads suitable for use in ion-exchange processes.

22. The gelled material composition of claim 19 that is formed into beads suitable for use in mixed mode chromatography for extracting substances selected from the group consisting of amino acids, peptides and proteins.

* * * * *

UNITED STATES PATENT AND TRADEMARK OFFICE
CERTIFICATE OF CORRECTION

PATENT NO. : 5,679,281
DATED : October 21, 1997
INVENTOR(S) : Gideon LEVIN and Lev BROMBERG It is certified that error appears in the above-identified patent and that said Letters Patent are hereby corrected as shown below:

On the cover page, at item [73], delete "; The Weizmann Institute of Science, both of"

and replace with

--, The Weizmann Institute of Science,--

Signed and Sealed this

Twenty-third Day of December, 1997

Attest:

BRUCE LEHMAN

Attesting Officer

Commissioner of Patents and Trademarks